United States Patent [19]
Konno et al.

[11] Patent Number: 5,532,466
[45] Date of Patent: Jul. 2, 1996

[54] PORTABLE ELECTRONIC EQUIPMENT

[75] Inventors: Masaki Konno; Kazuhiko Inobe, both of Yokohama; Kenichi Yoshiura, Sagamihara; Shuji Itoh, Yokohama, all of Japan

[73] Assignee: Matsushita Electric Industrial Co., Ltd., Osaka, Japan

[21] Appl. No.: 425,707

[22] Filed: Apr. 19, 1995

Related U.S. Application Data

[63] Continuation of Ser. No. 135,472, Oct. 13, 1993, abandoned.

[30] Foreign Application Priority Data

Oct. 20, 1992 [JP] Japan .................................. 4-281480

[51] Int. Cl.⁶ .................................................... G06K 7/06
[52] U.S. Cl. ............................ 235/441; 235/472; 439/55; 364/708.1
[58] Field of Search ...................................... 235/441, 375, 235/380, 472, 462; 361/681, 682, 683, 684, 686; 364/708.1, 709.11; 24/3 A, 3 F, 3 G, 3 J, 3 R; 439/271, 72, 377, 55

[56] References Cited

U.S. PATENT DOCUMENTS

| | | | |
|---|---|---|---|
| 1,207,746 | 12/1916 | Goodnough | 24/3 F |
| 1,356,902 | 10/1920 | Benyei | 24/3 F |
| 1,553,066 | 9/1925 | Burger | 24/3 F |
| 2,941,268 | 6/1960 | Morse | 24/3 J |
| 3,520,033 | 7/1970 | Usuda | 24/575 |
| 4,161,806 | 7/1979 | Hennisse et al. | 24/575 X |
| 4,341,951 | 7/1982 | Benton | 235/379 |
| 4,372,694 | 2/1983 | Bovio et al. | 400/88 X |
| 4,630,201 | 12/1986 | White | 364/408 X |
| 4,687,268 | 8/1987 | Picciotto et al. | 439/55 |
| 4,705,211 | 11/1987 | Honda et al. | 235/380 X |
| 4,719,338 | 1/1988 | Avery et al. | 235/380 X |
| 4,980,785 | 12/1990 | Talmadge | 360/97.02 |
| 4,999,885 | 3/1991 | Lee | 24/575 X |
| 5,006,002 | 4/1991 | Brodbeck | 400/613.2 |
| 5,006,699 | 4/1991 | Felkner et al. | 235/472 |
| 5,023,824 | 6/1991 | Chadima, Jr. et al. | 364/708 |
| 5,110,226 | 5/1992 | Sherman et al. | 400/88 |
| 5,121,865 | 6/1992 | Howard | 24/3 R |
| 5,155,659 | 10/1992 | Kunert | 361/380 |
| 5,173,597 | 12/1992 | Anglin | 235/483 |
| 5,180,905 | 1/1993 | Chen et al. | 235/483 |
| 5,218,187 | 6/1993 | Koenck et al. | 235/375 X |
| 5,220,520 | 6/1993 | Kessoku | 364/708 X |
| 5,260,552 | 11/1993 | Colbert et al. | 235/482 X |
| 5,265,951 | 11/1993 | Kumar | 312/223.2 |

FOREIGN PATENT DOCUMENTS 4295886  10/1992  Japan .

OTHER PUBLICATIONS

"Mustache Clean Restraint", IBM Technical Disclosure Bulletin, vol. 33 No. 9, Feb. 1991, p. 33.

Primary Examiner—Donald T. Hajec
Assistant Examiner—Michael G. Lee
Attorney, Agent, or Firm—Watson, Cole, Stevens, Davis

[57] ABSTRACT

This portable electronic device includes a body section and an IC card accessing part provided in the body section. The body section has an IC card insertion slot; an elastic wiper is provided in the IC card insertion slot to make contact with a contact part of an IC card when the IC card is inserted into the IC card accessing part through the IC card insertion slot and a surface of the IC card is guided by a side of the IC card insertion slot. In this way, water and the like can be wiped off of the contact part, via IC card slot wherein an elastic wiper extends downwardly from the upper first side of the IC card slot (i.e., the elastic wiper extends a part way across a portion of the IC card slot, but an embossed part of the IC card is not caught in the slot. The portable electronic device also includes a hand hold band which is attached to be removable when desired, but not by accident.

19 Claims, 16 Drawing Sheets

PORTABLE ELECTRONIC EQUIPMENT

This application is a continuation of application Ser. No. 08/135,472, filed Oct. 13, 1993 (abandoned).

BACKGROUND OF THE INVENTION

The present invention relates to a portable electronic device such as a portable terminal unit.

Conventionally, a portable electronic device of this kind, such as the one shown in FIGS. 20a, 20b, 21a and 21b, has been well-known. That is, FIGS. 20a and 20b are front and side views illustrating the conventional electronic device, and FIGS. 21a and 21b are rear and partly broken side views illustrating the same electronic device.

As understood from these figures, a manipulation part 52, a display part 53, an IC card reader and writer part 54, and a printer part 55 are provided in a body section 51, being arranged in the mentioned order in the longitudinal direction of the body section 51 from the front end to the rear end thereof. On the front side of the body section 51, the manipulation part 52 can be manipulated, the display part 53 can display thereon an image, an IC card 56 is inserted into the IC card reader and writer part 54, and further, a printing sheet 58 can be discharged from an opening 57 of the printer part 55 after printing. That is, the display part 53, the IC card reader and writer part 54, and the printer part 55 are all accessed on the manipulating side of the body section 51 along with the manipulation part 52. The body section 51 is connected to a bar code pen 60 through the intermediary of a connector 59a and a cable 59b. A hand hold band 61 is provided on the rear side of the body section 51. One end of the hand hold band 61 is coupled to a band pin 62, and the other end of the hand hold band 61 is coupled to a band attaching member 63. Meanwhile, a cut-out 64 is formed in the front end part of the body section 51 on the bottom side thereof, and locking grooves 65 are formed on opposite sides of the cut-out 64, being opened to the cut-outs 64 and opened in front of the body section 51. A cut-out 66 is formed in the rear end part of the body section 51 on the rear side thereof, and receiving parts 67 are formed on the opposite side parts of the cut-out 66, protruding therefrom. Further, the opposite end parts of the band pin 62 are inserted and locked in the locking grooves 65 at the front end of the body part 51, and thereafter, locking parts 68 on the opposite sides of the band attaching member 63 are inserted into slots defined by the receiving parts 67 at the rear end of the body section 51, as indicated by the solid line, so that the band pin 62 is locked. Accordingly, the hand hold band 61 is attached to the rear surface of the body section 51. Further, the band attaching member 63 is pulled out rearwardly of the body section 51, as indicated by the dotted arrow in FIG. 21b, and accordingly, the locking parts 68 are released from the receiving parts 67 of the body section 51. Thus, a battery casing cover 69 on the body section 51 can be opened.

The way of use of the above-mentioned portable electronic device will be hereinbelow explained.

Upon manipulation, the operator inserts his one hand between the lower surface of the body section 51 and the inside surface of the hand hold band 61 so as to hold the body section 51. Further, the operator inserts the IC card 56 into the IC card reader and writer part 54 so that he can use data in the IC card. Further, data can be input by means of the bar code pen 60 and can be used. Further, a sheet 58 can be printed thereon with data in the printer part 55 and discharged from the opening 57 so that the data can be output. Further, as mentioned above, the band attaching member 63 is pulled out rearwardly of the body section 51 so that the locking parts 68 are released from the receiving parts 67 of the body section 51, and accordingly, the hand hold band 61 is removed, so that the battery casing cover 69 can be opened for replacing a battery 70 with a new one. After the replacement of the battery, the battery casing cover 69 is closed, and then the locking parts 68 of the band attaching member 63 are inserted into the slots defined by the receiving parts 67 in the rear of the body section 51 so that the hand hold band 61 can again be attached to the rear surface of the body part 51.

However, in the above-mentioned electronic device, since the IC card reader and writer part 54 is mounted so as to be accessed on the manipulating side together with the display part 53, the printer part 55 and the like, the longitudinal length of the device is inevitably long in its entirety, and accordingly, the device is not sufficiently compact. Further, since, on one hand, the hand hold band 61 is attached to the body section 51 by locking the locking parts 68 of the band attaching member 63 for the hand hold band 61 to the receiving parts 67 of the body section 51 at the opened rear end of the body section 51, and since, on the other hand, the hand hold band 61 is removed from the body section 51 by releasing the locking parts 68 of the band attaching member 63 toward the open side at the rear end of the body section 51, if the body section 51 is released from the operator's hand unexpectedly, the band attaching member 63 comes off sometimes from the body section 51 so that the hand hold band 61 is removed from the body section 51. Accordingly, there has been risk of accidentally dropping the device which would therefore be damaged. Further, since the bar code pen 60 is connected to the body section 51 through the intermediary of the connector 59a and the cable 59b, the bar code pen 60 would hinder the manipulation of the device when the bar code pen 60 is not used. Further, since the opening 57 of the printer part 55 for the sheet 58 is exposed to the outside, the water proofing for the device has been imperfect when it not used.

SUMMARY OF THE INVENTION

The present invention is devised in order to eliminate the above-mentioned problems inherent to the conventional portable electronic device. Accordingly, one object of the present invention is to provide a portable electronic device which can be shortened in its longitudinal length so as to be compact in its entirety, which can prevent its hand hold band from coming off so as to prevent the device from being damaged when the body section thereof is unexpectedly released from the operator's hand, which can prevent its bar code pen from hindering the manipulation of the device when the bar code pen is not used, and in which the printer part has a waterproof structure for protection.

To this end, according to the present invention, there is provided a portable electronic device comprising a body section having front and rear ends, a manipulation side and a bottom side opposite to the manipulation side, an IC card reader and writer part provided at the rear end of the body part on the bottom side thereof, and a hand hold band attached on the bottom side of the body section in front of the IC card reader and writer part, so that it is possible to make the portable electronic device compact.

Further, an IC card insertion slot is preferably formed on one lateral side of the IC card reader and writer part, and a rubber wiper for removing water drops sticking to the contact part of an IC card upon insertion thereof is provided in the slot. Further, the wiper is preferably prevented from touching an embossed part of the IC card although it can touch the contact part thereof.

Further, according to the present invention, one end of the hand hold band on the IC card reader and writer part side is releasably locked to the body section by locking means so as to be prevented from coming off toward the rear end of the body section in a direction in which a force is exerted on the hand hold band upon manipulation of the electronic device, thereby to prevent damage to the entire equipment caused when the device is dropped.

Further, the above-mentioned locking means can comprise a band attaching member attached to the hand hold band and having locking parts at opposite sides thereof, and receiving parts formed on the body section and protruding toward the IC card reader and writer part, for locking the locking part of the above-mentioned band attaching member, or can comprise a band attaching member attached to the hand hold band and having locking parts formed therein with locking holes, at opposite sides of the hand hold band, receiving parts formed on the body section and protruding toward the IC card reader and writer part, for locking the locking parts of the band attaching member, and locking protrusions formed at the rear surfaces of the receiving parts, for locking the above-mentioned locking holes.

Further, according to the present invention, a bar code pen storage part is formed in the above-mentioned body section in order to prevent the bar code pen from hindering the manipulation of the electronic device.

A hold means for holding a bar code pen when the bar code pen is stored in the bar code pen storage part is provided in the bar code storage part and is preferably made of an elastic material such as sponge or rubber.

Further, according to the present invention, the printer part including its outlet opening for a printed sheet is covered with an openable water-tight cover in order to protect the printer part.

Thus, according to the present invention, since the IC card reader and writer part and the hand hold band are provided at the front and rear ends of the body section, respectively, on the bottom side opposite to the manipulating side of the body section, the functions thereof are effected respectively on the top and bottom sides of the body section, so that it is possible to shorten the overall longitudinal length of a portable electronic device.

Further, since the one end of the hand hold band on the IC card reader and writer part side is releasably locked to the body section by locking means so as to be prevented from coming off rearwardly of the body section in a direction in which a force is applied to the hand hold band during manipulation of the portable electronic device, it is possible to prevent the hand hold band from being released from the body part when the body section unexpectedly comes off from the operator's hand, and further, it is possible to remove the hand hold band only when it is necessary.

Further, with the provision of the bar code pen storage part in the body section, the bar code pen can be stored in this storage part when it is not used.

Further, with the provision of the openable water-tight cover with which the printer part and the printed sheet outlet opening are covered, it is possible to aim at effecting drip-proof measures for the printer part.

BRIEF DESCRIPTION OF THE DRAWINGS

These and other objects, advantages, features and uses of the invention will become more apparent as the description proceeds, when considered with the accompanying drawings in which:

FIG. 20b is a side view illustrating the portable electronic device shown in FIG. 20a;

FIG. 21a is a rear view illustrating the portable electronic device shown in FIG. 20a; and FIG. 21b is a partly cut-out side view illustrating the portable electronic device shown FIG. 20a.

DETAILED DESCRIPTION OF THE PREFERRED EMBODIMENTS

Explanation will be hereinbelow made of preferred embodiments of the present invention with reference to the drawings.

First, referring to FIGS. 1 to 9b, a first embodiment of the present invention will be explained.

Figure 1:
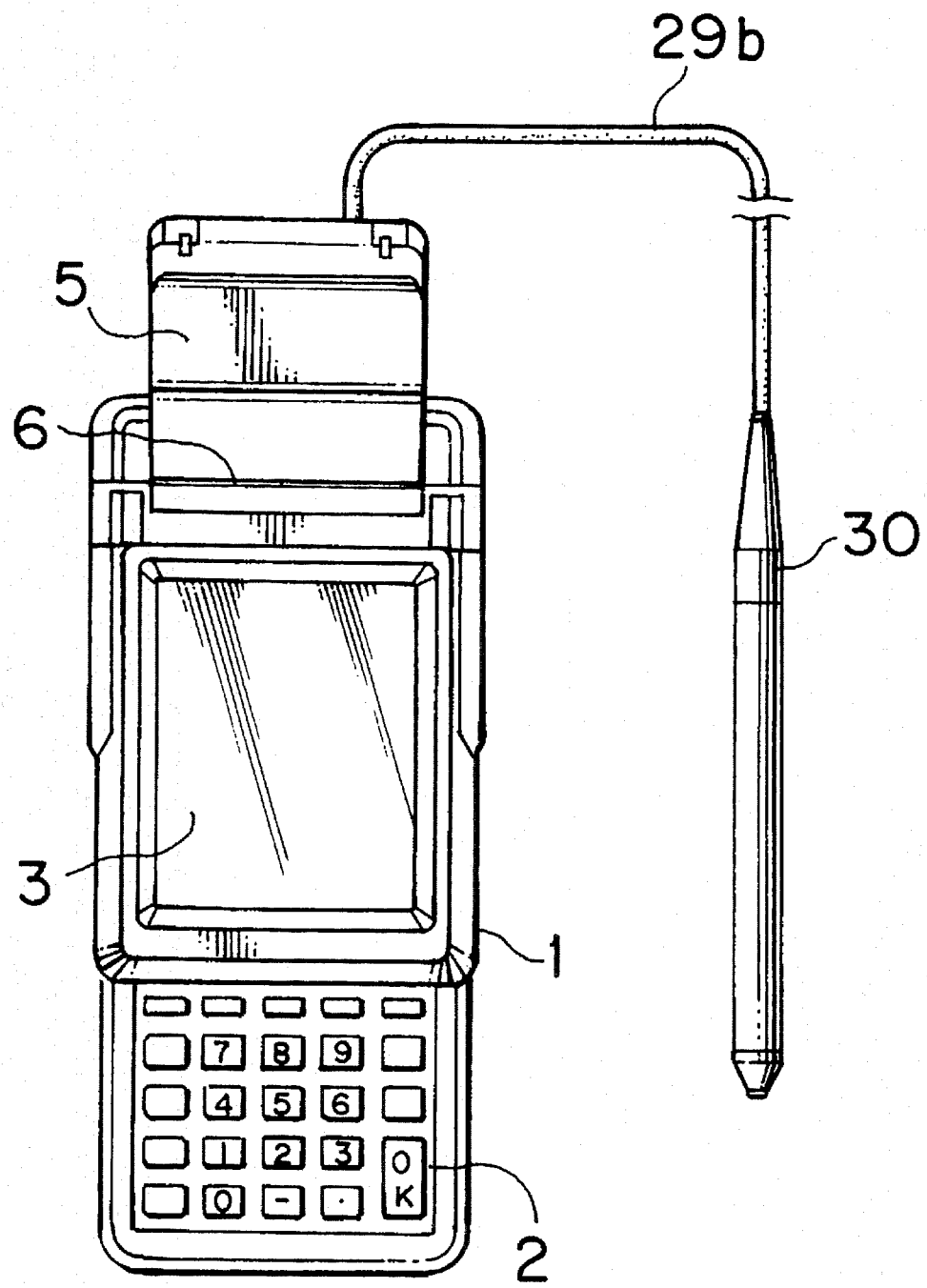
FIG. 1 is a front view illustrating a portable electronic device in one embodiment of the present invention.
Figure 2:
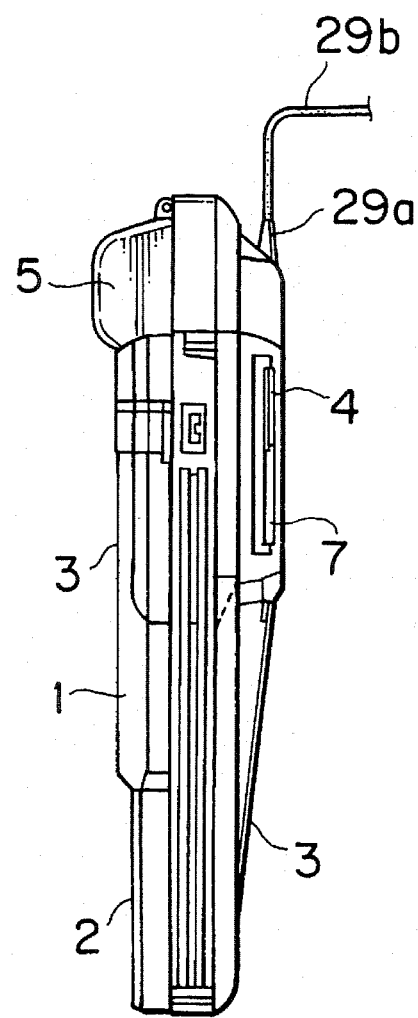
FIG. 2 is side view illustrating the portable electronic device shown in FIG. 1.
Figure 3:
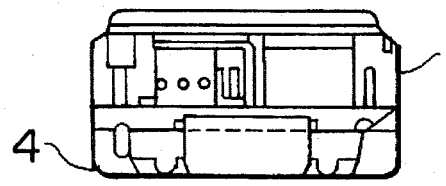
FIG. 3 is a bottom view illustrating the portable electronic device shown in FIG. 1.

As shown in FIGS. 1 to 3, a body section 1 is incorporated therein with a manipulation part 2, a display part 3, an IC card reader and writer part 4 and a printer part 5. The manipulation part 2 can be operated on the front side of the body section 1, and the display part 3 can be located to provide a display on the front side thereof. Further, the printer part 3 is provided, being extended from the front end toward the rear end thereof so that a printed sheet (which is not shown) is discharged from an outlet opening on the front side of the body section 1. The IC card reader and writer part 4 is provided on the bottom side of the body section 1 opposite to the above-mentioned manipulating side, in the rear end part thereof, being extended between the bottom side part of the display part 3 and the front end part of the printer part 5, and protruding from the rear surface of the body section 1.

Figure 4A:
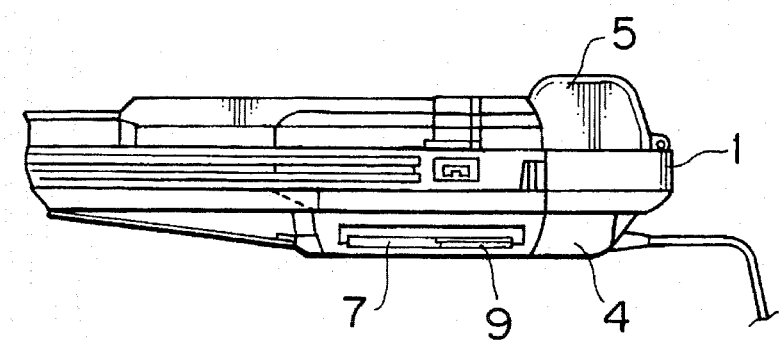
FIG. 4a is an enlarged side view illustrating an essential part of the portable electronic device shown in FIG. 1.
Figure 4B:
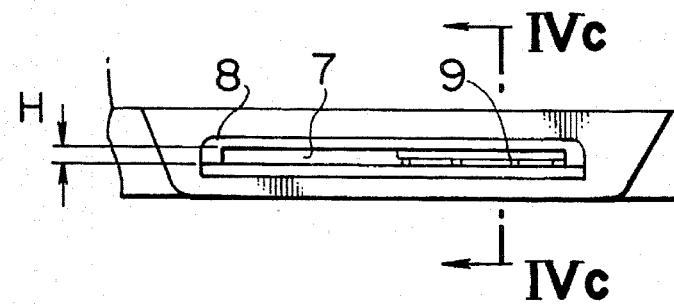
FIG. 4b is an enlarged view illustrating an IC card insertion opening in the portable electronic device shown in FIG. 1.
Figure 4C:
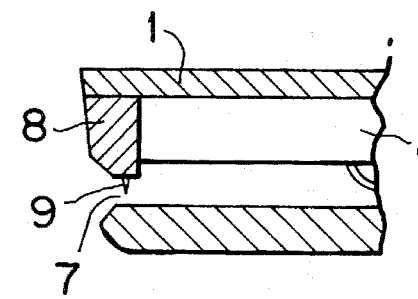
FIG. 4c is a sectional view along the line IVc—IVc in FIG. 4b.
Figure 5:
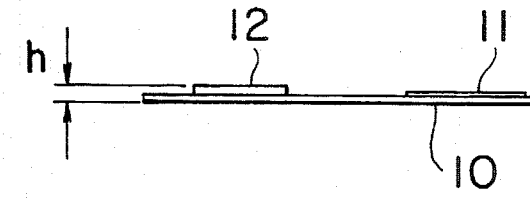
FIG. 5 is a side view illustrating an IC card used in the portable electronic device shown in FIG. 1.

The IC card reader and writer part 4 has an IC card insertion slot 7 which is positioned laterally on the body section 1. As shown in FIGS. 4a to 4c, at one side of the IC card insertion slot 7, a rubber card cover part 8 integrally incorporated with a flexible rubber wiper 9 suspended therefrom is provided. Meanwhile, as shown in FIG. 5, an IC card 10 is provided with a contact part 11 and an embossed part 12. When the IC card 10 is inserted into the IC card reader and writer part 4 through the IC card insertion slot 7, the contact part 11 is rubbed by the wiper 9 so that water drops or the like are removed therefrom (refer to FIG. 7). Further, as clearly shown in FIG. 4b and FIG. 5, the height H of the IC card insertion slot 7, excluding the wiper 9, is set so as to be slightly higher than the height h of the embossed part 12 of the IC card 10.

Figure 8:
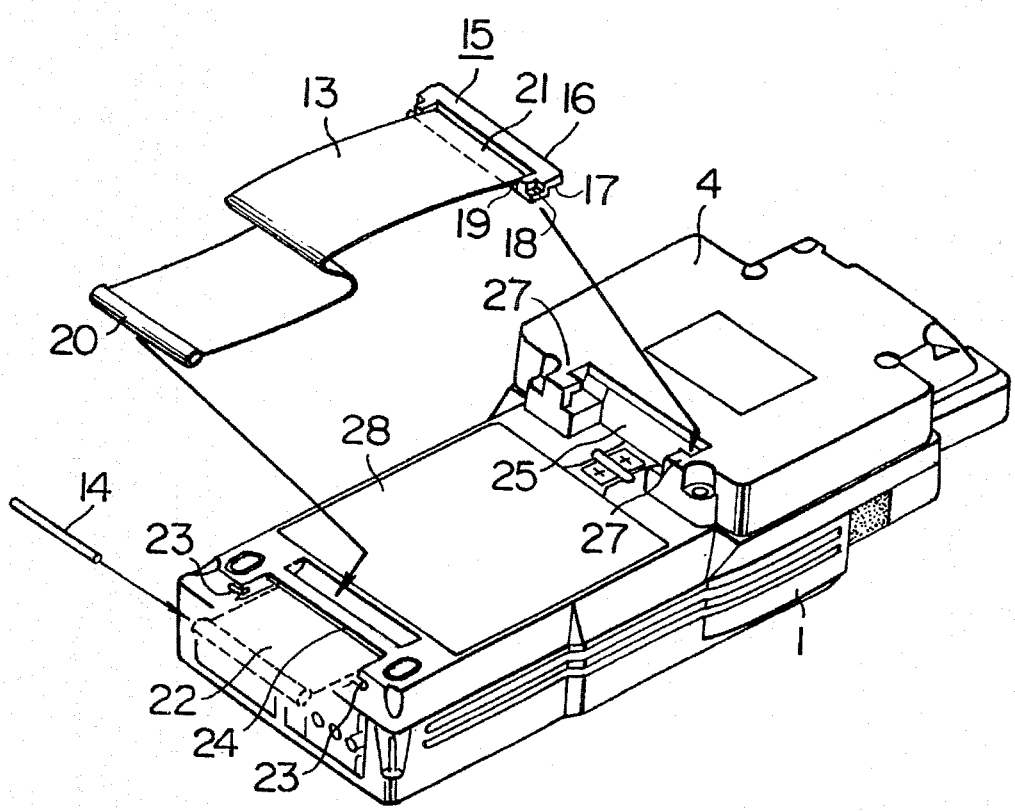
FIG. 8 is a perspective view illustrating the portable electronic device shown in FIG. 1, before attachment of a hand hold band onto the body section of the portable electronic device.
Figure 9A:
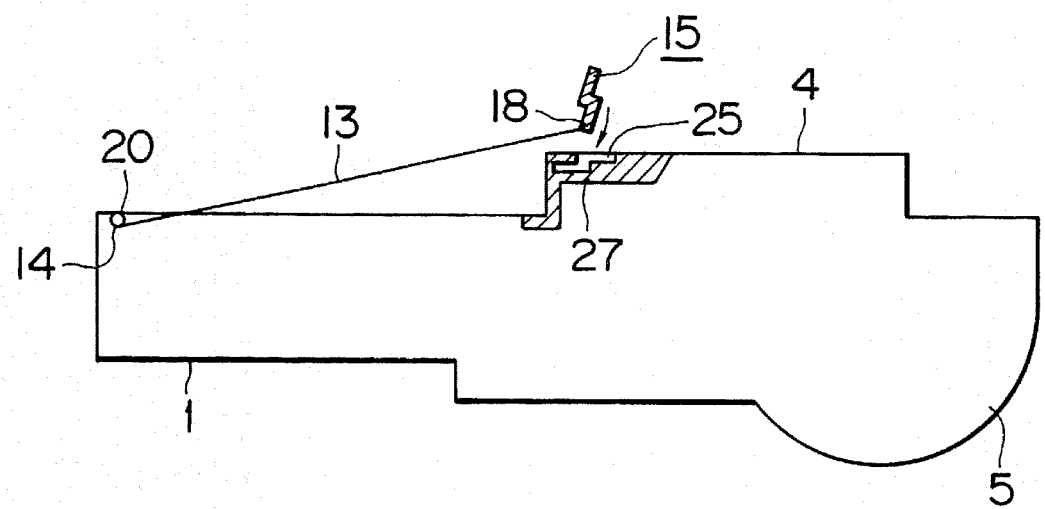
FIG. 9a is a partly broken schematic view illustrating the portable electronic device shown in FIG. 1 before attachment of the hand hold band to the body section.
Figure 9B:
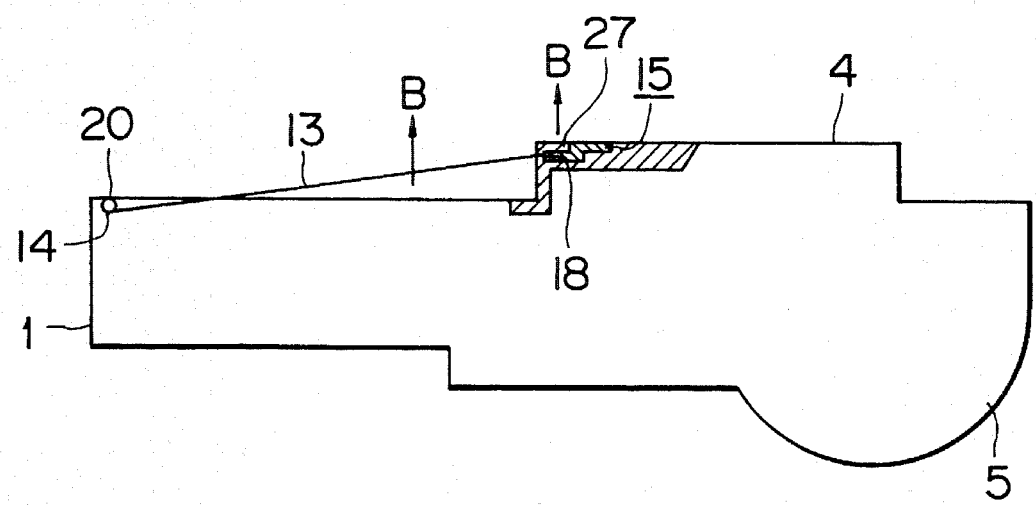
FIG. 9b is a partly broken schematic view illustrating the portable electronic device after attachment of the hand hold band to the body section.

As shown in FIG. 8 and FIGS. 9a and 9b, a hand hold band 13 is removably attached by a locking means at the bottom side of the body section 1, remote from the manipulating side or the top side of the body section 1, in front of the IC card reader and writer part 4. The hand hold band 13 is made of a thin rubber sheet, two opposing ends thereof being coupled to a band pin 14 and a band attaching member 15, respectively. The band attaching member 15 has locking parts 18 connected thereto on opposite sides of a base plate 16 through the intermediary of stepped parts 17, and a connecting part 19 is connected between the locking parts 18. Further, the hand hold band 13 is formed at its one end with a sleeve part 20 by sewing, and the band pin 14 is inserted into the sleeve part 20 so that the hand hold band 13 can be coupled to the body section 1. The hand hold band 13 is further formed at its the other end with a sleeve part 21, surrounding the coupling part 19 of the band attaching member 15, by sewing so that it is connected to the coupling part 19. Meanwhile, a recess 22 is formed in the center part of the front end part of the body section 1 at the bottom side thereof, and locking grooves 23 opened to the recess 22 and at the front end of the body section 1 are formed at opposite side parts of the recess 22. A band retainer 24 is formed across the recess 22 in the intermediate part of the recess 22. A recess 25 which receives the band attaching member 15 so as to inhibit the same from moving toward the rear of the body section 1 is formed in the center part of the front end part of the IC card reader and writer part 4 on the rear side of the body section. A cut-out 26 is formed in the center part of the bottom part of the recess 25, and receiving parts 27 for locking the locking parts 18 of the band attaching member 15 so as to inhibit the same from coming off of the body section are provided at the front end of opposite side parts of the recess 25. Further, after the hand hold band 13 is inserted inside of the band retainer 24 as shown in FIG. 8, the opposite end parts of the band pin 14 are inserted, at the front end of the body section 1, into the locking grooves 23 and is then locked in the latter as shown in FIG. 9a, and the band attaching member 15 is pushed obliquely into the recess 25 in the body section 1 from the locking parts 18 which are positioned at the opposite sides of the hand hold band 13, and is turned down and laid in a horizontal direction as shown in FIG. 9b so that the band attaching member 15 is stored in the recess 25, being inhibited from moving rearward of the body section 1, and then the locking parts 18 are locked in the receiving parts 27, being inhibited from coming off of the body section 1, so that the band attaching member 15 is securely attached. Accordingly, the hand hold band 13 is attached to the front part of the body section 1 on the bottom side of the latter. When the hand hold band is to be released, the band attaching member 15 is turned obliquely upward so that the locking parts 18 thereof are released from the receiving parts 17 of the body section 1, and accordingly, the band attaching member 15 is released from the body section 1 so that the hand hold band 13 is removed. Accordingly, a battery casing cover 28 in the front part of the body section 1 on the bottom side of the latter can be opened.

As shown in FIGS. 1 and 2, a bar code pen 30 is connected to the rear end of the body section 1 through the intermediary of a connector 29a and a cable 29b.

Next, explanation will be hereinbelow made of the use of the portable electronic device having the above-mentioned structure.

Figure 6:
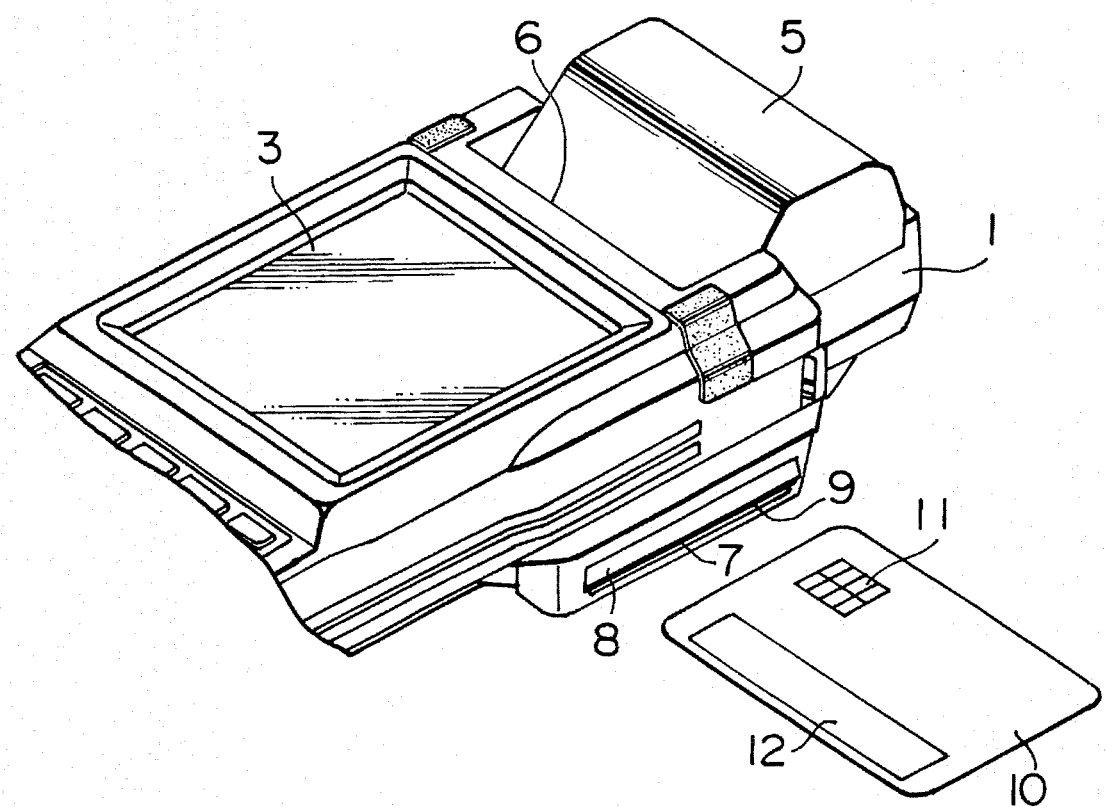
FIG. 6 is a perspective view illustrating the IC card before insertion into an IC card reader and writer part of the portable electronic device shown in FIG. 1.
Figure 7:
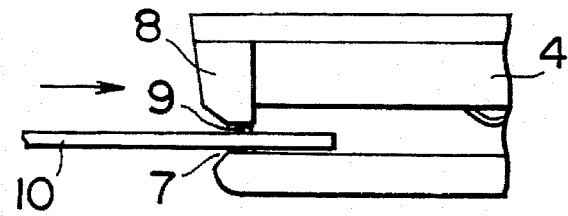
FIG. 7 is a partly sectioned view illustrating the IC card during insertion into the IC card reader and writer part of the portable electronic device shown in FIG. 1.

To use the portable electronic device, the operator inserts his hand between the bottom side of the body section 1 at the front end of the same and the hand hold band 13 so as to hold the body section 1. At this time, the hand hold band 13 is drawn in a direction indicated by the arrow B in FIG. 9b so as to be subjected to a large tensile stress, but there is no fear that the hand hold band 13 will come off, since the locking parts 18 of the band attaching member 15 are locked in the receiving parts 27 of the body section 1 so as to be prevented from coming off. Further, as shown in FIGS. 6 and 7, if the IC card 10 is inserted into the IC card reader and writer part 4 through the IC card insertion slot 7, data stored in the IC card 10 can be used. At this time, the contact part of the IC card 10 is rubbed by the wiper 9 so that water drops such as rain drops possibly sticking to the contact part because of rainy weather or the like can be wiped off, and accordingly, it is possible to prevent the contact part 11 of the IC card 10 from short-circuiting. Further, since the height H of the IC card insertion slot 7 is slightly higher than the height h of the embossed part of the IC card 10 (refer to FIG. 4b and FIG. 5), it is possible to prevent the embossed part 12 from being damaged. Further, the flexibility of the cable 29b allows the bar code pen 30 to be used to input data. Further, data are printed on a printing sheet which is then discharged from the outlet opening 6; that is, the data can be output.

During the above-mentioned use of the portable electronic device, if the body section 1 is accidentally released from the operator's hand, there is no fear that the hand hold band 13 will come off from the body section 1, since there is no such risk that the band attaching member 15 comes off toward the rear of the body section 1, so that it is possible to prevent the entire portable electronic device from being dropped.

Further, when the band attaching member 15 is turned obliquely upward so that the locking parts 18 thereof are released from the receiving parts 27 of the body section 1, the band attaching member 15 is released from the recess 25 in the body section 1, and accordingly, the hand hold band 13 can be removed. Accordingly, the battery casing cover 28 on the body section 1 can be opened so that batteries (which are not shown) can be replaced with the new one. After the replacement of the batteries, the battery casing cover 28 is closed, and then the locking parts 18 at both sides of the band attaching member 15 are inserted obliquely into the recess 25 of the body section 1 while the band attaching member 15 is turned down and laid in a horizontal direction. Accordingly, as shown in FIG. 9b, the band attaching member 15 is stored in the recess 25 so as to be prevented from moving toward the rear of the body section 1, and further, the locking parts 18 are locked in the receiving parts 27 so as to be prevented from coming off of the body section 1 in a downward direction, that is, coming off in a direction in which a force is applied to the hand hold band 13. Thus, the hand hold band 13 can be attached to the front end part of the body section 1 on the bottom side of the latter.

Next, explanation will be made hereinbelow of a second embodiment of the present invention with reference to the drawings.

Figure 10:
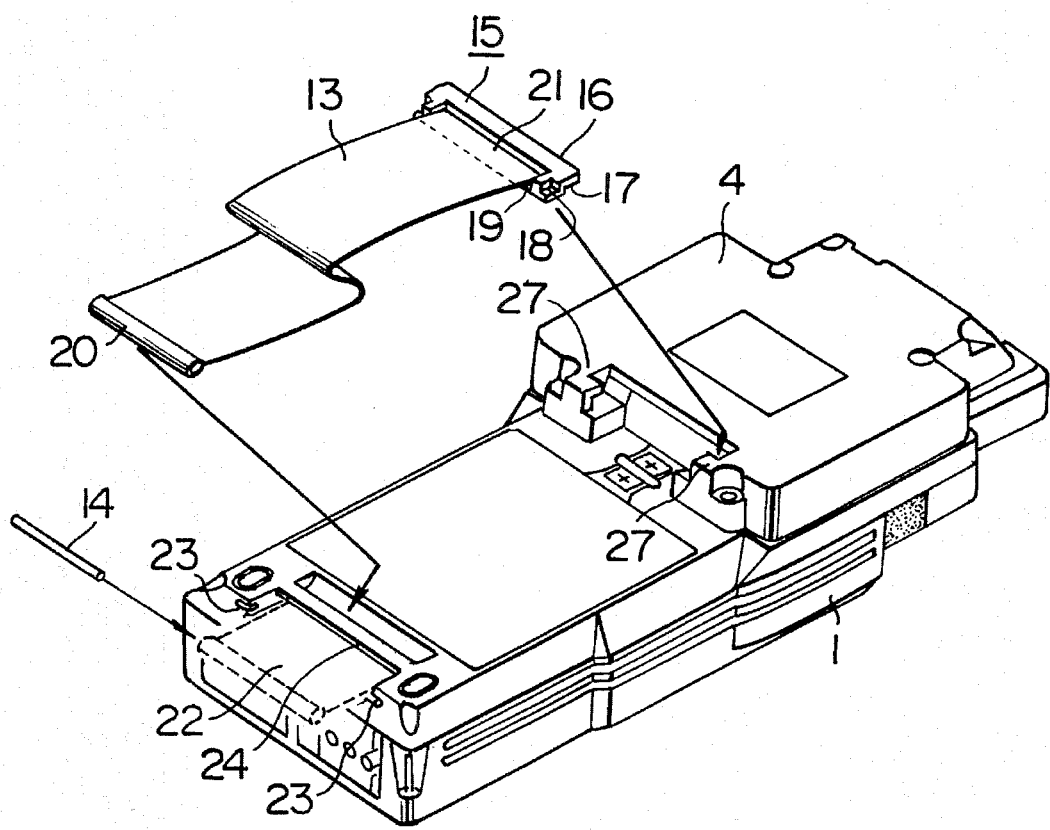
FIG. 10 is a perspective view illustrating a portable electronic device in a second embodiment of the present invention, before attachment of its hand hold band to the body section thereof.
Figure 11A:
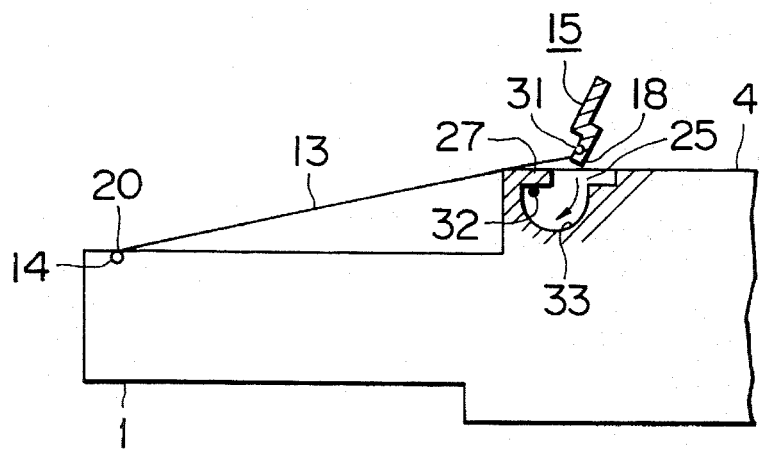
FIG. 11a is a schematic sectional view illustrating the portable electronic device shown in FIG. 10 before attachment of the hand hold band to the body section.
Figure 11B:
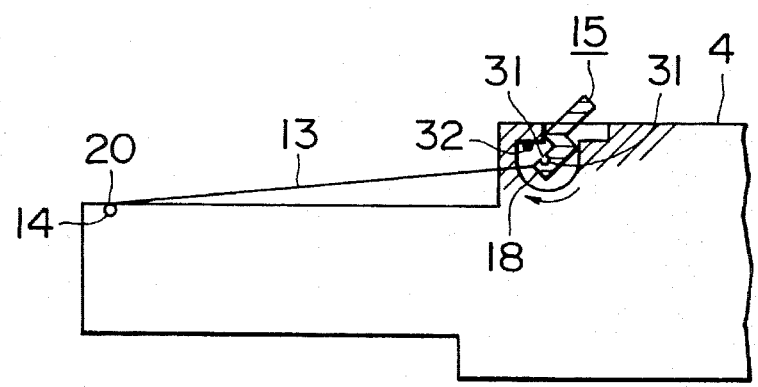
FIG. 11b is a schematic sectional view illustrating the portable electronic device shown in FIG. 10 during attachment of the hand hold band onto the body section.

FIGS. 10 to FIG. 11b show a portable electronic device in the second embodiment of the present invention.

The arrangement of the portable electronic device in the second embodiment is substantially the same as that in the first embodiment, except that the locking means of the hand hold band 13 on the IC card reader and writer part 4 is different in the first and second embodiments, and accordingly, the like reference numerals are used to denote like parts to those explained in the first embodiment so that the explanation to the like parts will be abbreviated. That is, explanation will be made of only different parts in this embodiment.

Figure 11C:
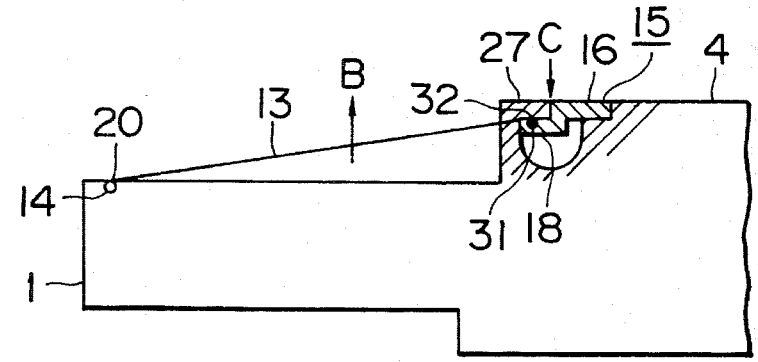
FIG. 11c is a schematic sectional view illustrating the portable device shown in FIG. 10 after the hand hold band is attached to the body section.

As shown in FIGS. 11a to 11c, a circular locking hole 31 is formed on the bottom surface of each of the locking parts 18 of the band attaching member 15, and a spherical locking protrusion 32 is formed on the top surface of each of the receiving parts 27 of the body section 1, and an arcuate recess 33 for allowing the associated locking part 18 to rotate therein is formed in the rear part of each of the receiving parts 27.

Further, as shown in FIG. 11a, the opposite sides of the band pin 14 are inserted into the locking grooves 23 at the front end of the body section 1, and is then locked therein (refer to FIG. 10), and then the band attaching member 15 is inserted obliquely into the recess 25 in the body section 1 at the locking parts 18 thereof, and then the band attaching member 15 is turned as shown in FIG. 11b so as to be laid in a horizontal direction as shown in FIG. 11c. Accordingly, the locking parts 18 can be locked in the receiving parts 27, and the locking holes 31 of the locking parts 18 can be locked on the locking protrusions 32 of the receiving parts 27. Accordingly, even though a force is applied to the hand hold band 13 in the direction indicated by the arrow B, there is no fear that the hand hold band 13 will come off, since there is no such risk that the band attaching member 15 is released from the body section 1 unless the front end of the base board 16 is pressed in a direction C which is opposite to the above-mentioned direction. When the user needs to replace the batteries, the front end of the base board 16 of the band attaching member 15 is pressed in the direction C so as to release the locking holes 31 from the locking protrusions 32, as shown in FIG. 11c, and then the band attaching member 15 is turned and is then pulled up obliquely rearward, as shown in FIGS. 11b and 11a so that the band attaching member 15 is released, so that it is possible to remove the hand hold band 13.

Referring to FIGS. 12 to 18b, explanation will be hereinbelow made of a third embodiment of the present invention.

Since the arrangement of the portable electronic device in this embodiment is substantially the same as that explained in the first embodiment, except that the bar code pen 30 is stored in the body section 1, like reference numerals are used to denote like parts to those explained in the first embodiment so that explanation to the like parts will be abbreviated. That is, explanation will be made of the different structure alone.

As shown in FIG. 12 to 18b, a bar code pen storage part 34 is formed on one lateral side which is remote from the IC card insertion slot 7, on the rear side of the body section 1. A hold member 35 made of a material having an elasticity and a large friction coefficient, such as a sponge or urethane group material (for example, poron HH-48-C manufactured by Rogers Inoac Co.), is attached on the inside of the bar code pen storage part 34 by means of a double sided adhesive tape, and at least one part thereof protrudes into the bar code pen storage part 34.

Figure 15:
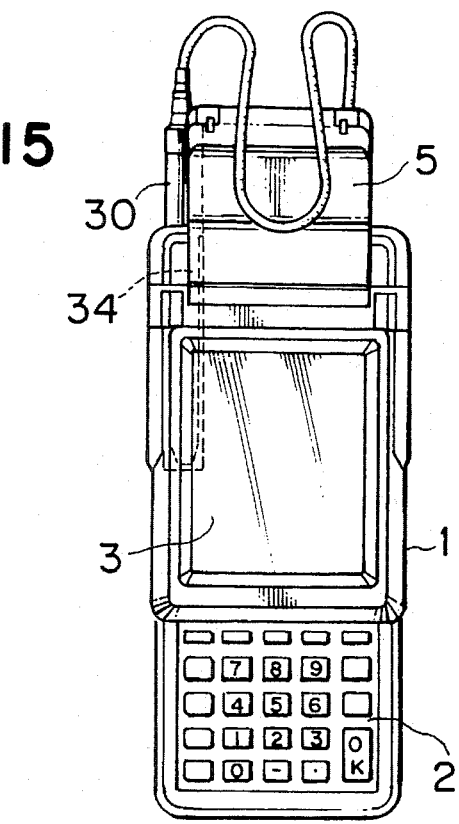
FIG. 15 is a front view illustrating the portable electronic device with the bar code pen being stored in the bar code pen storage part.
Figure 16:
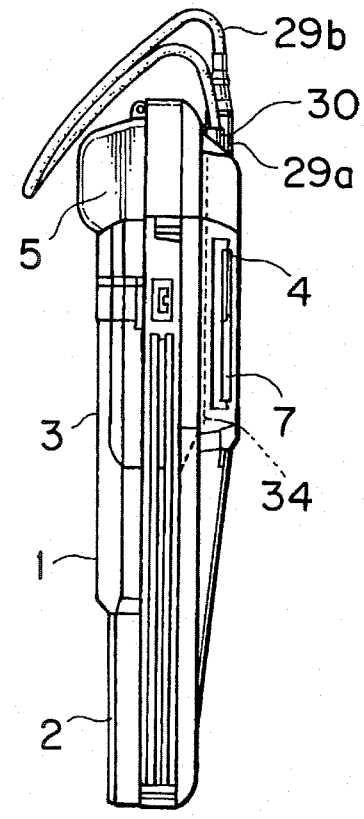
FIG. 16 is a side view illustrating the portable electronic device shown in FIG. 12 with the bar code pen being stored in the bar code pen storage part.
Figure 17A:
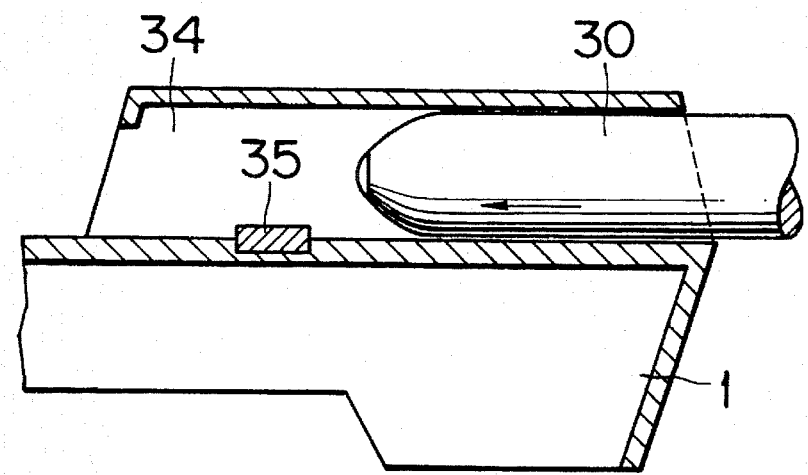
FIG. 17a is a partly enlarged sectional view illustrating the portable electronic device shown in FIG. 12 during storage of the bar code pen into the bar code pen storage part.
Figure 17B:
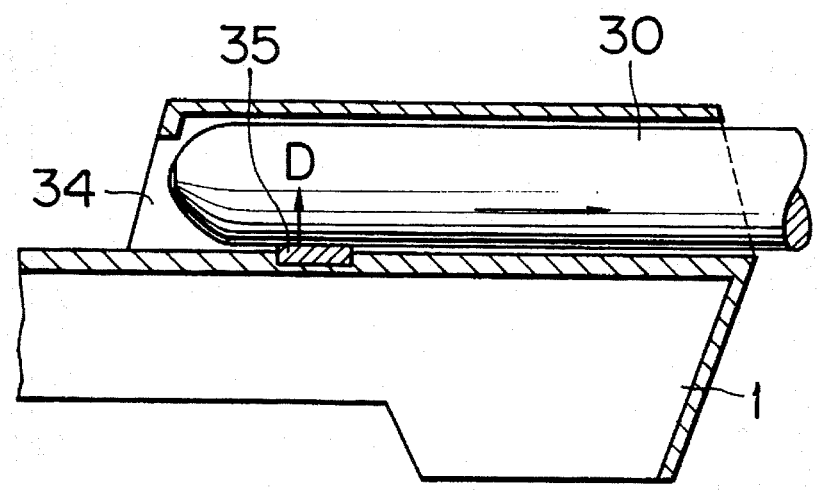
FIG. 17b is a partly enlarged sectional view illustrating the portable electronic device shown in FIG. 12 after storage of the bar code pen in the bar code pen storage part.
Figure 18A:
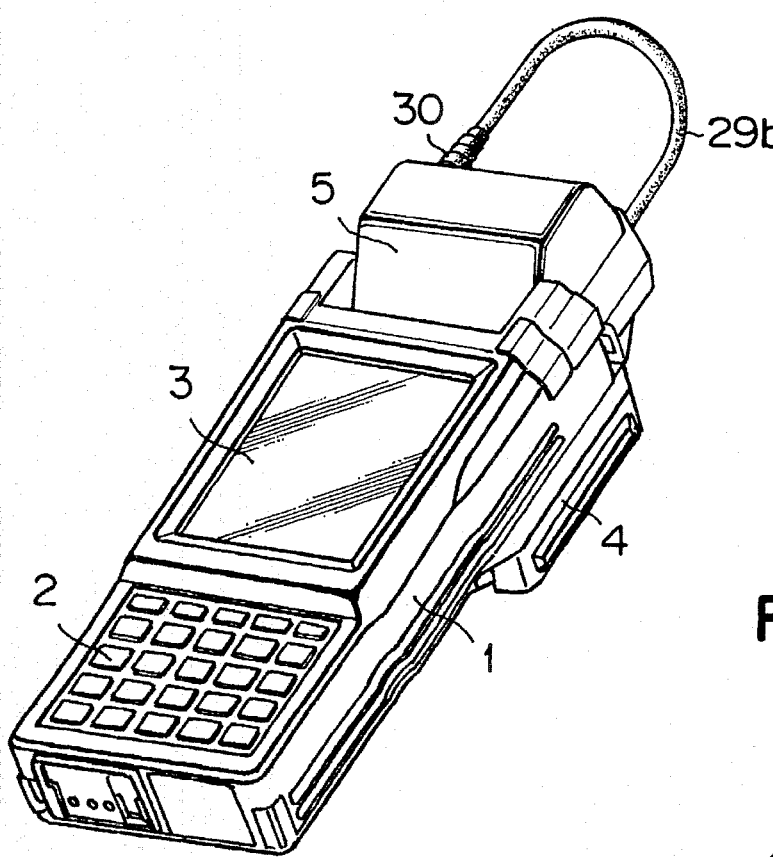
FIG. 18a is a perspective view illustrating the portable electronic equipment shown in FIG. 12, in such a condition that the bar code pen is stored in the bar code pen storage part, and the portable electronic device is used in its normal posture.
Figure 18B:
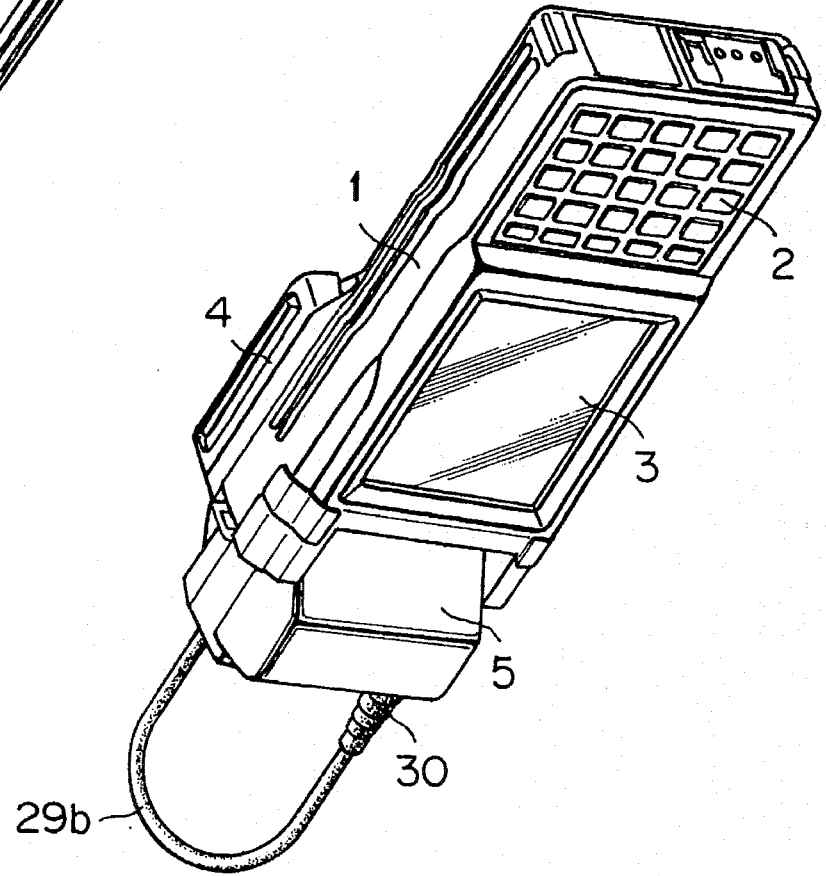
FIG. 18b is a perspective view illustrating the portable electronic device shown in FIG. 12, in such a condition that the bar code pen is stored in the bar code pen storage part, and the portable electronic device is used in its inverted posture.

Further, when the bar code pen 30 is not used, the bar code pen 30 is inserted, from its front end thereof, into the bar code pen storage part 34, as shown in FIG. 17a. At the termination of this insertion, the bar code pen 30 is pressed so that it is further moved by the elastic deformation of the hold member 35, and accordingly the storage of the bar code pen 30 is completed, as shown in FIGS. 15 and 16. In this condition, the bar code pen 30 is held so as to be prevented from coming off from the bar code pen storage part 34 in the direction indicated by the arrow, under a stress D caused by the repulsion of the hold member 35. Accordingly, not only when the portable electronic device is used in its normal posture, as shown in FIG. 18a, but also when the same is used in its inverted posture, as shown in FIG. 18b, the dead weight of bar code pen 30 is not sufficient to make the bar code pen 30 come off from the bar code pen storage part 34, so that it is possible to enhance the ease of manipulation of the portable electronic device.

Figure 12:
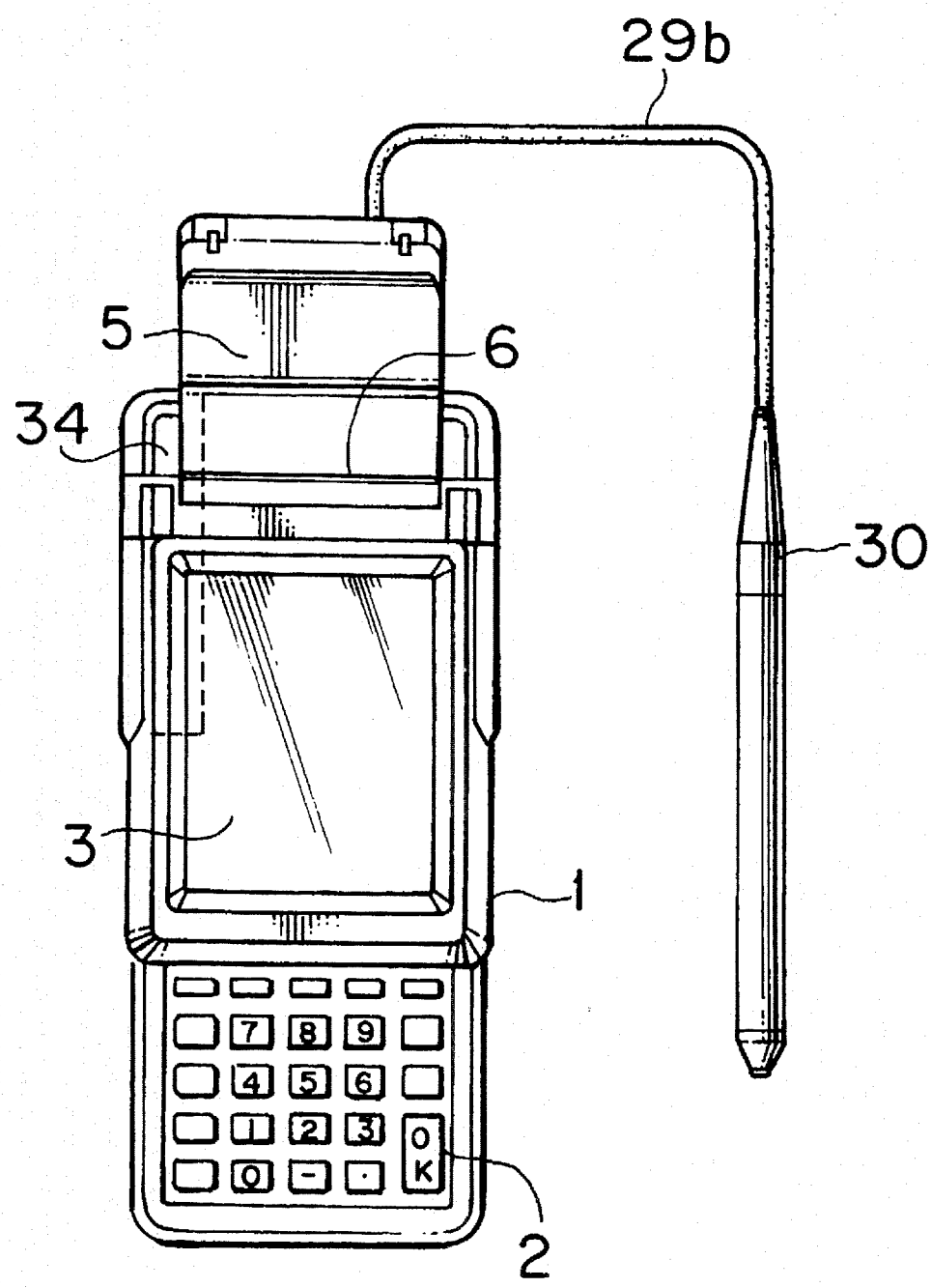
FIG. 12 is a front view illustrating an portable electronic device in a third embodiment of the present invention.
Figure 13:
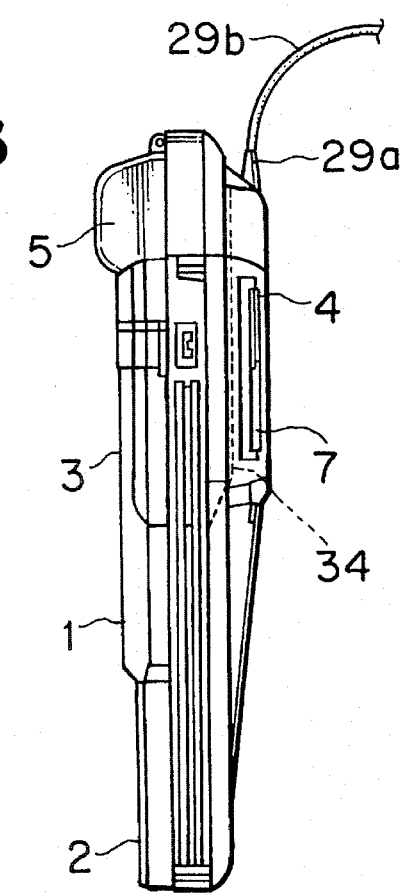
FIG. 13 is a side view illustrating the portable electronic device shown in FIG. 12 with its bar code pen being removed from its bar code pen storage part.
Figure 14:
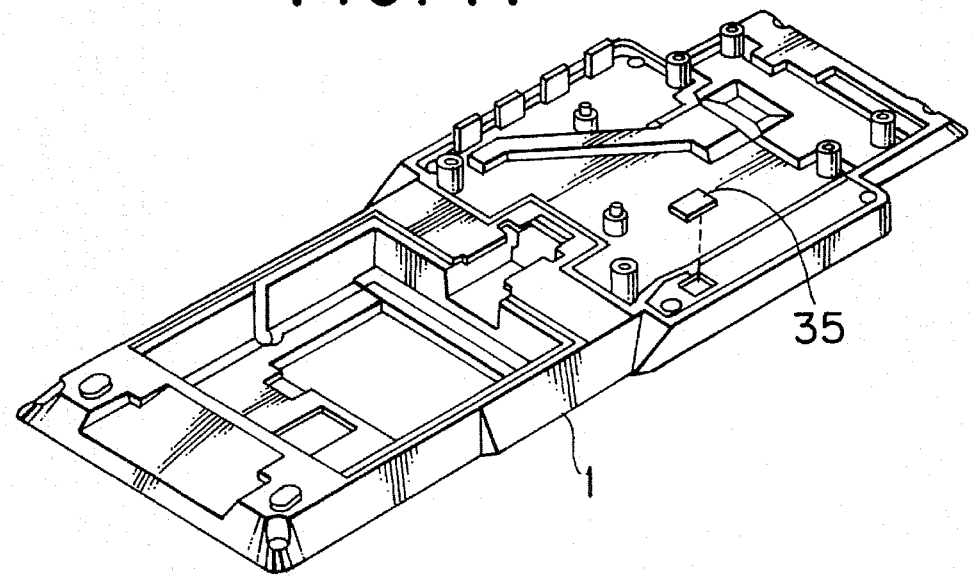
FIG. 14 is a perspective view illustrating a perspective view illustrating an exploded perspective view illustrating a part of the portable electronic device shown in FIG. 12.

When the user desires to use the bar code pen 30, it is forcibly pulled, overcoming the stress D given by the hold member 35, so that it can be taken out from the bar code pen storage part 34, as shown in FIGS. 12 and 13.

Explanation will be made hereinbelow of a fourth embodiment of the present invention with reference to FIGS. 19a and 19b.

This embodiment is the same as the first embodiment, except that a watertight cover is provided in this embodiment, and accordingly, like reference numerals are attached to like parts to those explained first embodiment, so that detailed explanation thereof will be abbreviated.

Figure 19A:
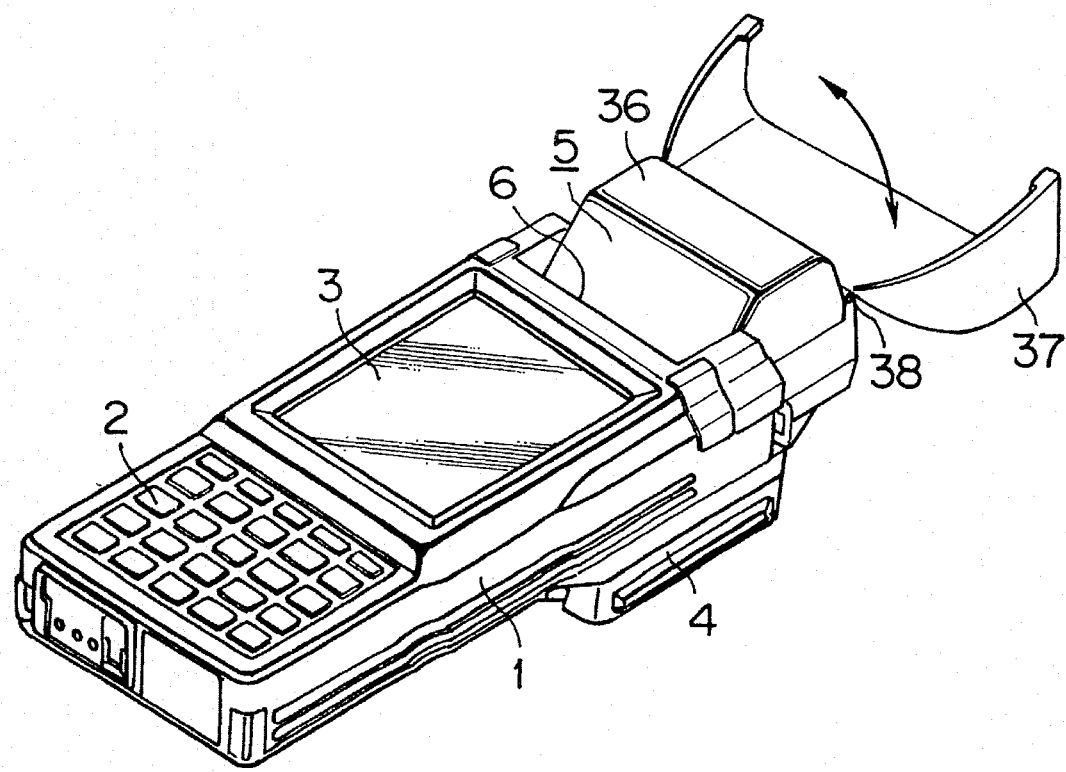
FIG. 19a is a perspective view illustrating a portable electronic device in a fourth embodiment of the present invention with its water-tight cover being opened.
Figure 19B:
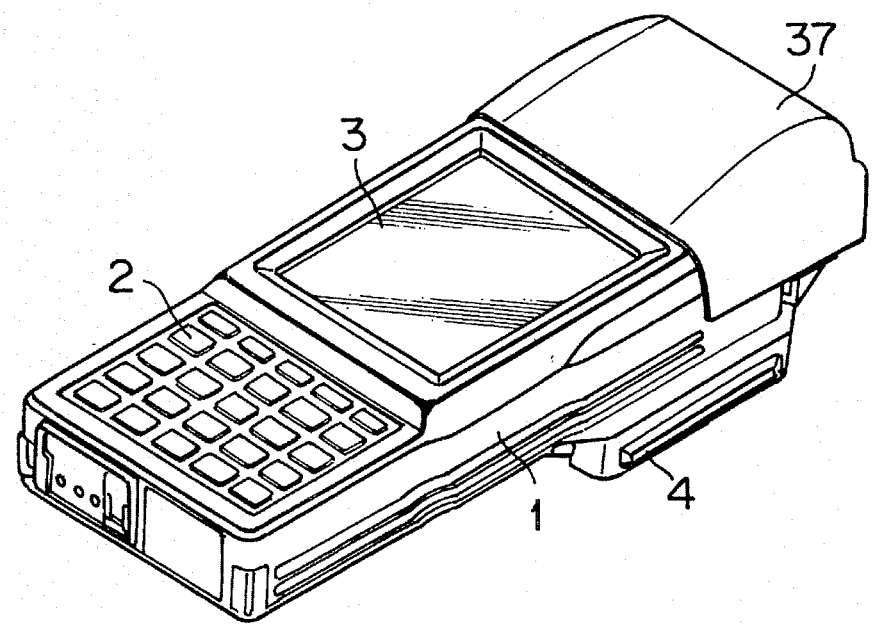
FIG. 19b is a perspective view illustrating the portable electronic device shown in FIG. 19a with the water-tight cover being closed.
Figure 20A:
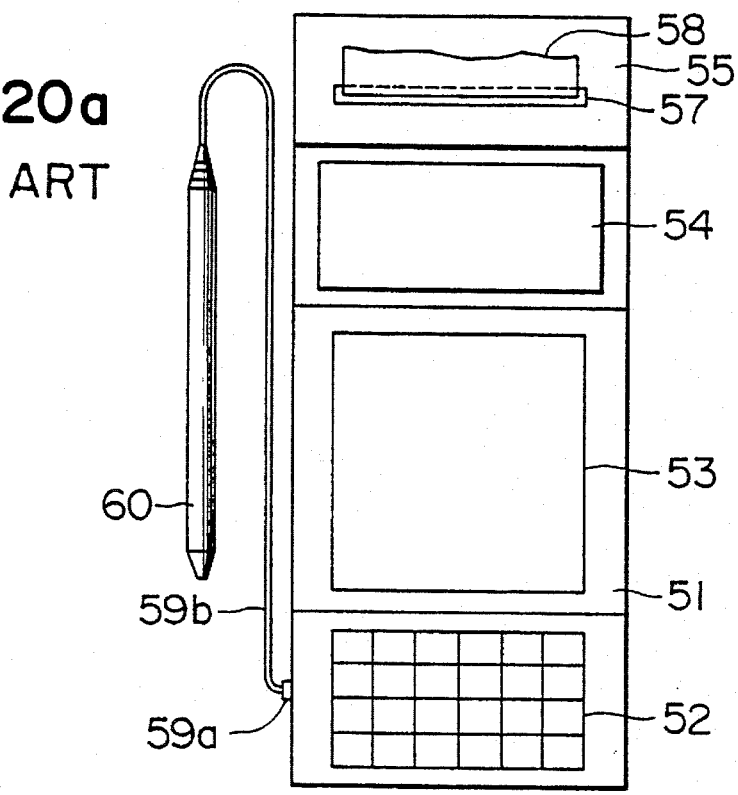
FIG. 20a is a front view illustrating a conventional portable electronic device.
Figure 20B:
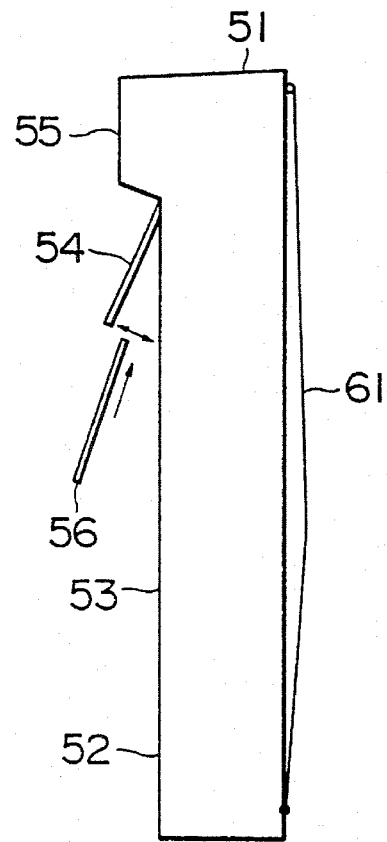
Figure 21A:
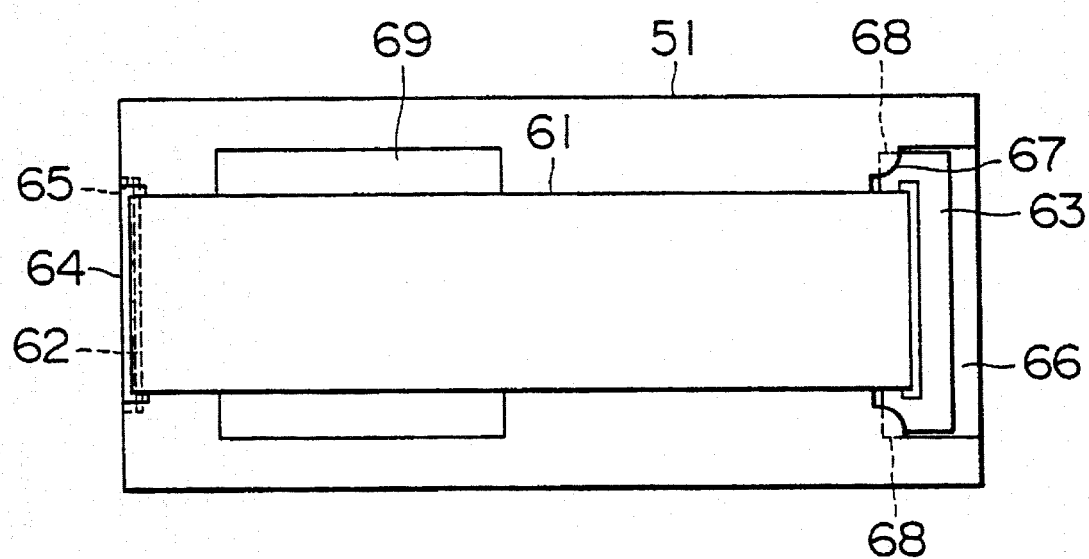
Figure 21B:
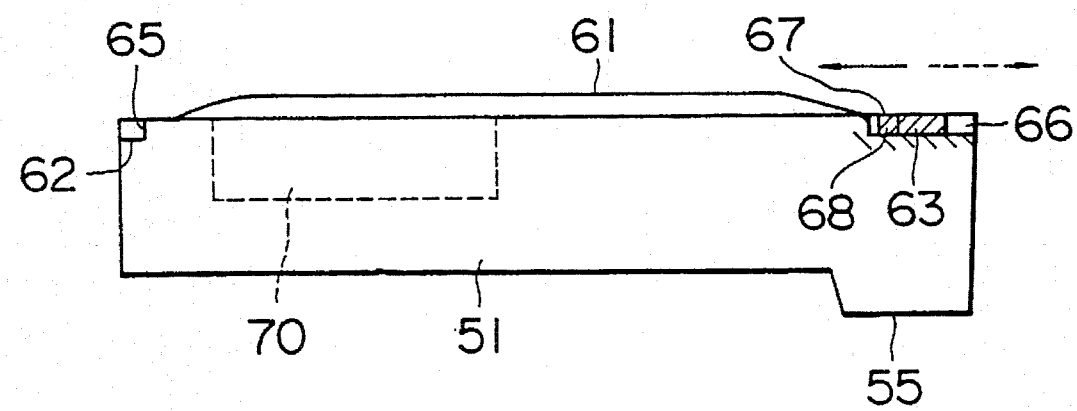

As shown in FIGS. 19a, and 19b, a water-tight cover 37 is attached at its base part to the rear end part of a printer cover 36 at the rear end of the body section 1, rotatably by means of a hinge 38. Further, when the water-tight cover 37 is opened, the printer part 5 can be exposed, and when it is closed, the printer part 5 can be covered therewith together with the outlet port 6 for the printing sheet.

Accordingly, as mentioned above, upon use of the printer part 5, the water-tight cover 37 is opened so as to expose the printer part 5, and when the printer part 5 is not used, the printer part 5 is covered with the water-tight cover 37 together with the outlet port 6 in order to aim at shielding the printer part 5 from water drops.

Although the preferred embodiments of the present invention have been detailed hereinabove, the present invention should not limited to these embodiments. That is, various design changes can be made thereto without departing from the concept of the present invention. It is noted that one or more of the arrangements explained in the above-mentioned several embodiments can be combined.

As mentioned above, according to the present invention, the IC card reader and writer part is provided in the rear end part of the body section on the bottom side of the latter, and the hand hold band is provided in the rear end part of the body section on the bottom side of the latter; that is, the functional components are provided on both the top and bottom sides of the body section, so that the overall length of the portable electronic device can be shortened, and the device can be made compact.

Further, since the rubber wiper is provided in the IC card insertion slot formed at one lateral side of the IC card reader and writer part, upon insertion of an IC card, water drops sticking to the contact part of the IC card can be wiped off, so that it is possible to prevent the contact part of the IC card from short-circuiting.

Further, since the wiper provided in the IC card insertion slot does not make contact with the embossed part of the IC card, the insertion of the IC card is facilitated, and further, it is possible to avoid abrasion of the embossed part caused by the friction between the wiper and the embossed part.

Since one end part of the hand hold band on the IC card reader and writer part side is locked by means of the locking means so as to be prevented from coming off in a direction in which a force is applied to the hand hold band during manipulation of the portable electronic device, the force being rearward of the body section, it is possible to prevent the body section from being accidentally released and dropped from the operator's hand during the manipulation of the portable electronic device, so that it is possible to prevent damage thereto.

Further, since the above-mentioned locking means comprises the band attaching member attached to the hand hold band and having locking parts on the opposite sides of the hand hold band, and receiving parts formed on the body section and protruding toward the IC card reader and writer part, for locking the locking parts of the band attaching member, or comprises the band attaching member attached to the hand hold band and having locking parts on the opposite sides of the hand hold band, each of which is formed therein with a locking hole, and receiving parts formed on the body section and protruding toward the IC card reader and writer part, each of which is formed on its back surface with a locking protrusion for receiving the above-mentioned associated locking hole, the hand hold band can be surely prevented from coming off, with a simple structure.

Further, since the bar code pen storage part is formed in the body section in which the bar code pen is stored, it is possible to enhance the ease of manipulation of the portable electronic equipment when the bar code pen is not in use.

Due to the provision of the bar code pen hold member in the bar code pen storage part, it is possible to prevent the bar code pen from being dropped, and accordingly, the portable electronic device can be manipulated in any of various postures including an inverted posture.

Further, since the above-mentioned hold member is made of an elastic material such as sponge or rubber, the holding force for the bar code pen can be obtained at a low cost.

Further, the printer part is covered with the water-tight cover together with the printing sheet outlet port, so that it is possible to aim at shielding the printer part against water drops.

What is claimed is:

1. A portable electronic device comprising:

a body section;

an IC card accessing part provided in said body section and adapted to receive an IC card and to access data on said IC card, said IC card having a first surface and a second surface and having a contact part and an embossed part on said first surface, said IC card having a thickness h as measured between a top of said embossed part and said second surface;

an IC card insertion slot formed in said body section and positioned to allow said IC card to be inserted into said IC card accessing part, said IC card insertion slot having an upper side and a second lower side which is opposite to said first upper side, said first Upper side and said second lower side being adapted to face said first surface and said second surface of said IC card, respectively, when said IC card is inserted into said IC card accessing part, said first upper side and said second lower side being spaced apart by a distance H which is greater than said thickness h of said IC card, and said second lower side having a flat surface formed thereon; and an elastic wiper extending from said first upper side of said IC card insertion slot and adapted to make contact with said contact part of said IC card when said IC card is inserted into said IC card accessing part through said IC card insertion slot and said second surface of said IC card is guided by said flat surface of said second lower side of said IC card insertion slot; wherein:

when said IC card is inserted into said IC card accessing part through said IC card insertion slot, said elastic wiper presses on said first surface of said IC card so as to wipe said contact part of said IC card while said second surface of said IC card is guided smoothly by said second lower side of said IC card insertion slot.

2. A portable electronic device as set forth in claim 1, wherein said body section is provided therein with a bar code pen storage part.

3. A portable electronic device as set forth in claim 2, wherein said bar code pen storage part is provided therein with a hold means for holding a bar code pen which is stored in the bar code pen storage part.

4. A portable electronic device as set forth in claim 3, wherein said hold means is made of an elastic material.

5. A portable electronic device as set forth in claim 4, wherein said elastic material of which said hold means is made comprises sponge.

6. A portable electronic device as set forth in claim 4, wherein said elastic material of which said hold means is made comprises rubber.

7. A portable electronic device as set forth in claim 1, wherein said body section is provided therein a printer part having a printing sheet outlet port, and said printer part is covered with an openable water-tight cover together with said outlet port.

8. A portable electronic device as set forth in claim 1, further comprising a hand hold band attached to said body section.

9. A portable electronic device as set forth in claim 8, further comprising locking means for releasably locking one end of said hand hold band to said body section so as to prevent said hand hold band from coming off when a force is applied to said hold band downward from said body section.

10. A portable electronic device as set forth in claim 9, wherein said locking means comprises a band attaching member attached to said hand hold band and having locking parts on opposite sides of said hand hold band; and receiving parts formed on said body section and protruding toward said IC card acessing part, for locking said locking parts of said band attaching member.

11. A portable electronic device as set forth in claim 9, wherein said locking means comprises a band attaching member attached to said hand hold band and having locking parts on opposite sides of said hand hold band, each having a back surface formed therein with a locking hole; and receiving parts formed on said body section and protruding toward said IC card accessing part, for receiving said locking parts of said band attaching member, each having a back surface formed therein with locking protrusion for receiving said associated locking hole.

12. A portable electronic device as set forth in claim 12, wherein said body section has a top side and a bottom side, and wherein said hand hold band is attached to said bottom side.

13. A portable electronic device as set forth in claim 12, further comprising locking means for releasably locking one end of said hand hold band to said body section so as to prevent said hand hold band from coming off when a force is applied to said hand hold band downward from said body section.

14. A portable electronic device as set forth in claim 13, wherein said locking means comprises a band attaching member attached to said hand hold band and having locking parts on opposite sides of said hand hold band; and receiving parts formed on said body section and protruding toward said IC card accessing part, for locking said locking parts of said band attaching member.

15. A portable electronic device as set forth in claim 13, wherein said locking means comprises a band attaching member attached to said hand hold band and having locking parts on opposite sides of said hand hold band, each having a back surface formed therein with a locking hole; and receiving parts formed on said body section and protruding toward said IC card accessing part, for receiving said locking parts of said band attaching member, each having a back surface formed therein with locking protrusion for receiving said associated locking hole.

16. A portable electronic device as set forth in claim 12, wherein said body section has a front end part and a rear end part, said IC card accessing part is disposed in said rear end part of said body section at said bottom side of said body section, and said hand hold band is attached to said body section at least at said front end part of said body section.

17. A portable electronic device as set forth in claim 16, further comprising locking means for releasably locking one end of said hand hold band to said body section so as to prevent said hand hold band from coming off when a force is applied to said hand hold band downward from said body section.

18. A portable electronic device as set forth in claim 12, wherein said locking means is comprises of a band attaching member attached to said hand hold band and having locking parts on opposite sides of said hand hold band; and receiving parts formed on said body section and protruding toward said IC card accessing part, for locking said locking parts of said band attaching member.

19. A portable electronic device as set forth in claim 17, wherein said locking means comprises a band attaching member attached to said hand hold band and having locking parts on opposite sides of said hand hold band, each having a back surface formed therein with a locking hole; and receiving parts formed on said body section and protruding toward said IC card accessing part, for receiving said locking parts of said band attaching member, each having a back surface formed therein with locking protrusion for receiving said associated locking hole.

* * * * *